April 9, 1968  SETSUO YASUE  3,376,756
CHAIN DRIVE AND HOUSING ARRANGEMENT
Filed April 7, 1965  6 Sheets-Sheet 1
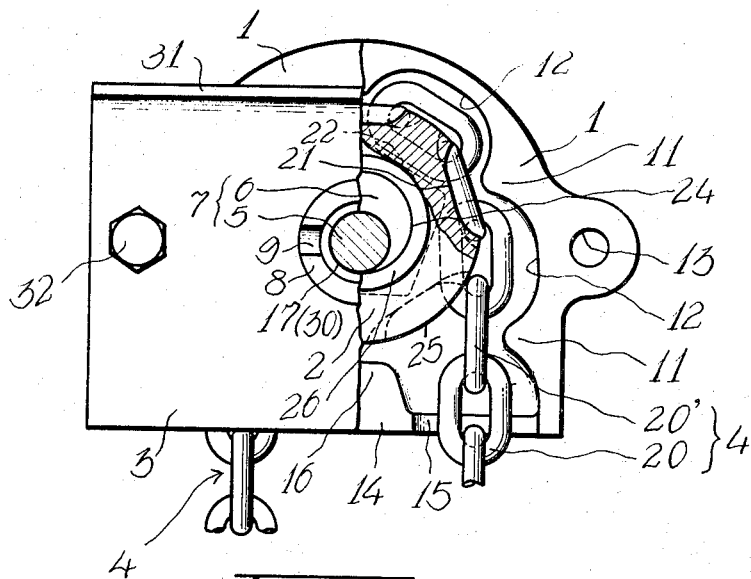
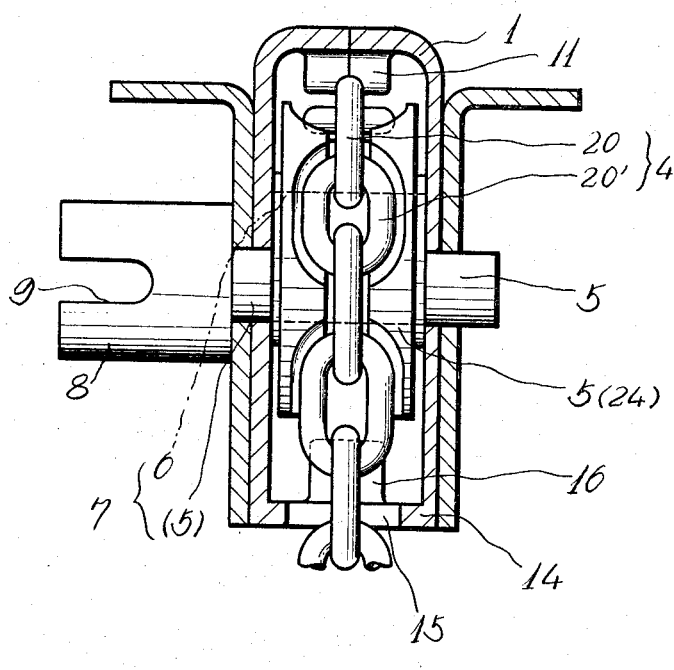
INVENTOR.
Setsuo Yasue.
BY
Michael J. Striker April 9, 1968
SETSUO YASUE
3,376,756
CHAIN DRIVE AND HOUSING ARRANGEMENT
Filed April 7, 1965
6 Sheets-Sheet 2
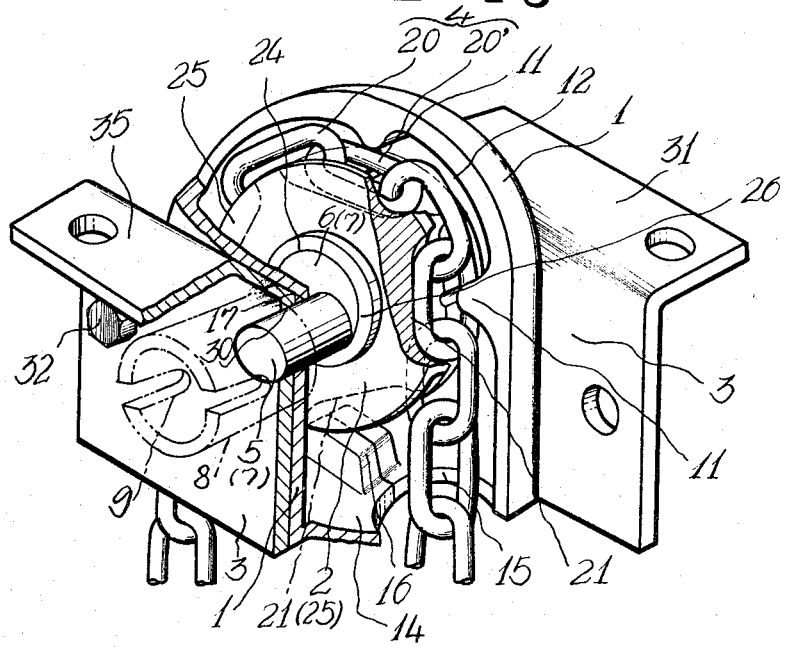
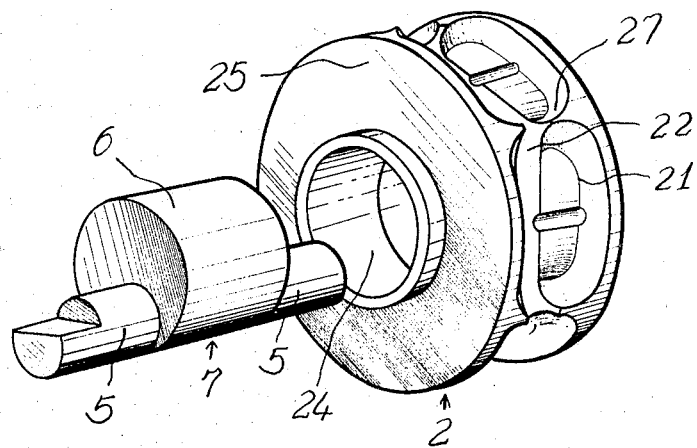
INVENTOR.
Setsuo Yasue
BY Michael J. Striker April 9, 1968  SETSUO YASUE  3,376,756
CHAIN DRIVE AND HOUSING ARRANGEMENT
Filed April 7, 1965  6 Sheets-Sheet 3

INVENTOR.
Setsuo Yasue
BY
Michael J. Striker

April 9, 1968 SETSUO YASUE 3,376,756
CHAIN DRIVE AND HOUSING ARRANGEMENT
Filed April 7, 1965 6 Sheets-Sheet 4

INVENTOR.
Setsuo Yasue
BY
Michael J. Striker

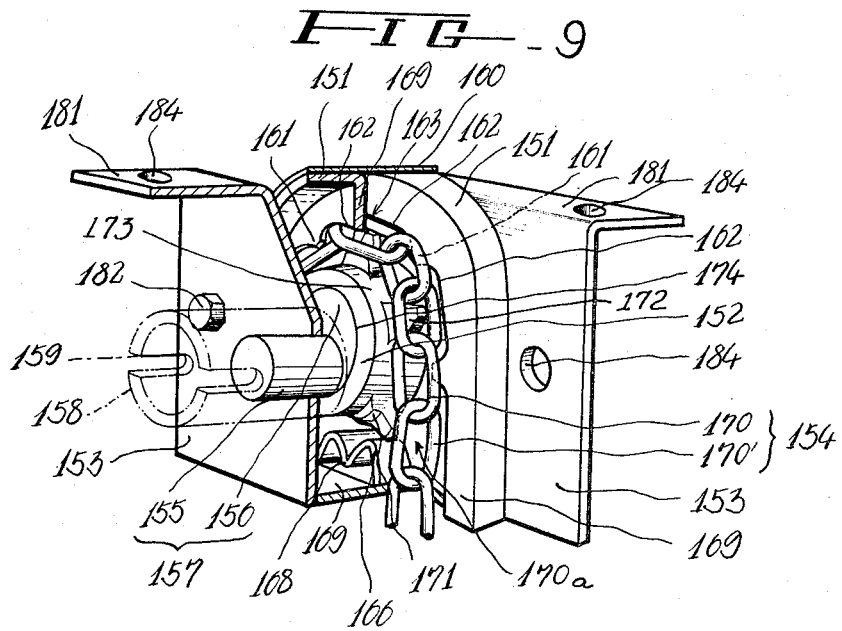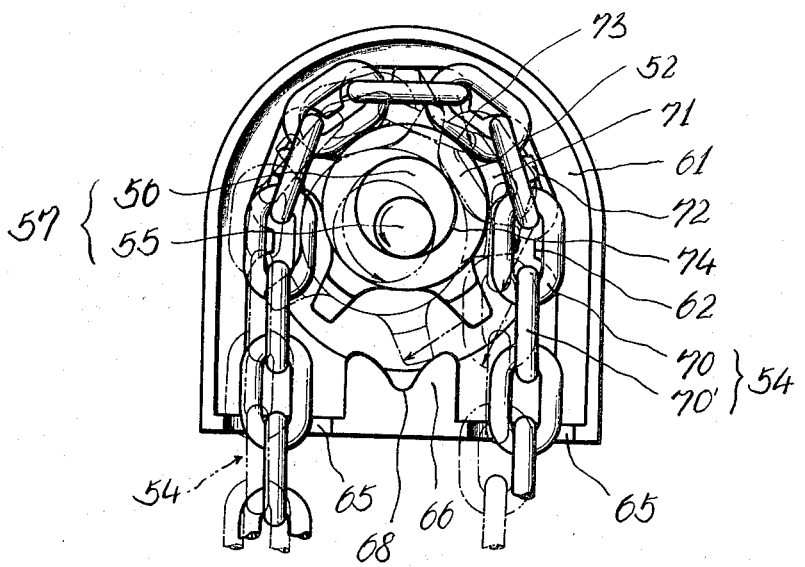

April 9, 1968
SETSUO YASUE
3,376,756
CHAIN DRIVE AND HOUSING ARRANGEMENT
Filed April 7, 1965
6 Sheets-Sheet 6
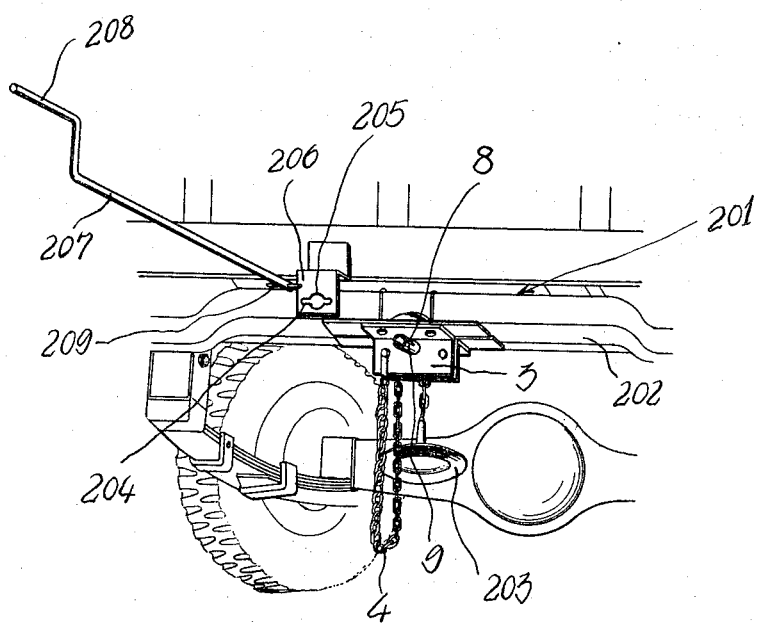
INVENTOR.
Setsuo Yasue
BY Michael J. Striker

3,376,756
CHAIN DRIVE AND HOUSING ARRANGEMENT
Setsuo Yasue, Kani-gun, Japan, assignor to Sanko
Kiki Kabushiki Kaisha, Nagoya, Japan
Filed Apr. 7, 1965, Ser. No. 446,159
Claims priority, application Japan, Apr. 13, 1964,
39/20,570
20 Claims. (Cl. 74—116)

The present invention relates to a chain drive and housing arrangement. More particularly, the invention relates to drive and housing arrangements for linked chains.

Linked chain has been used in many applications for the transmission of motive power. Prior art chain driving apparatus utilize a so-called chain wheel which is essentially a gear with projections extending into the holes of the chain links.

In prior art chain drives the required input to the drive is equal to or greater than the output load of the chain. Accordingly, when the chain is operated manually or with a limited input power, the output load is limited. In order to overcome this shortcoming, and to provide a greater output than input, an eccentric shaft loosely fitted as the driving shaft of the chain wheel has been used. However, although such apparatus may produce a greater output than input, the components for transmitting the working power to the chain by rotation of the chain wheel are either lengthwise links or crosswise links which are arranged alternately. The difficulty with alternately arranged lengthwise links or crosswise links only is that they are under concentrated pressure from the driving force and the chain wheel or the chain links have a tendency to be damaged, broken or destroyed.

In an alternately lengthwise and crosswise linked arrangement, the links have circular sections which are engaged with the teeth of the chain wheel. To prevent the links from slipping off the tooth, the teeth of the chain wheel must have an adequate length. Large or long teeth, however, tend to damage or crack the chain. In order to lessen such a tendency, a greater number of links should engage the teeth of the chain wheel at the same time and the length of each tooth may be somewhat reduced.

In order to provide instantaneous engagement with a great number of teeth, however, the chain wheel must have a very large diameter, since it must have very many teeth. When the chain wheel is made larger, however, the entire drive apparatus must be large and thus requires more materials and is more expensive than other smaller apparatus. Furthermore, there are restrictions on a large-sized apparatus.

On the other hand, if the length of the teeth is limited, the chain is very likely to slip off the teeth. Thus, in a chain drive of this type, a device which prevents reverse movement of the chain is an absolute necessity. If the reverse movement prevention device is not provided with such a chain drive, any object supported by the chain cannot be maintained in position, and even if the chain is driven in a belt system, the chain is invariably reversed in movement and loosened by the chain-supported object.

The provision of a reverse movement prevention device complicates the construction of the chain device and creates difficulties in the smoothness of operation of the reverse movement prevention device as well as in the smoothness of operation of the chain wheel. Furthermore, in the prior art chain drive apparatus, precision gearing is necessary in order to reduce the driving force by means of reduction gearing. Precision gearing further complicates the chain drive apparatus and may adversely affect the smoothness of operation of the chain drive.

The principal object of the present invention is to provide a new and improved chain drive which eliminates the aforementioned disadvantages and difficulties of prior art chain drive apparatus.

An object of the present invention is to provide a steadily and smoothly operating chain drive. In the chain drive apparatus of the prior art there is an engaging relation between the chain wheel and the chain. In such apparatus, if the chain is twisted, or if the chain rises above the wheel due to rapid driving of the chain wheel, there is poor engagement of the wheel with the chain link. This, as well as the limitation of the tooth length of the chain wheel, makes steady or smooth operation of the prior art apparatus impossible. Furthermore, if the chain slips off the chain wheel or if the supported object drops, or if the chain drops between the chain wheel and housing, the operation of the chain drive becomes impossible.

In the chain drive arangement of the present invention, the chain wheel is engaged with the chain, and, at the same time, the chain and the housing in which the chain wheel is positioned are in engagement with each other. The housing is fixed in position. The contact of the chain with both the chain wheel and the housing provides large engagement surfaces between the chain and the components of the chain drive apparatus. Furthermore, the chain engaging part of the housing functions to maintain or guide the engagement of the chain with the chain wheel. At the same time the chain wheel functions to maintain or guide the engagement of the chain with the engaging part of the housing. Thus, even if the chain links are twisted or displaced, the twist or displacement is always corrected and the chain is correctly or suitably guided so that a correct or suitable engagement between the chain and the chain wheel or rotor and the housing is maintained to insure correct or suitable driving of the chain.

Another object of the present invention is to provide chain driving apparatus with a reduction gear but without special gearing. More particularly, in the chain drive and housing arrangement of the present invention, the housing and the chain wheel or rotor are engaged through the medium of the chain by driving the chain between said housing and said chain wheel or rotor. The chain is engaged by projections on the inside of the housing and by projections on the rotor. Accordingly, in the chain drive apparatus of the present invention, a reduction gear for reducing the speed or force is inherent in the apparatus and is not actually required. The apparatus of the present invention is thus simplified over prior art apparatus.

Another object of the present invention is the elimination of a need for special apparatus for the prevention of reverse movement of the chain. Prior art chain drives do not prevent reverse movement of the chain unless a reverse movement prevention device is utilized, as hereinbefore mentioned. A reverse movement prevention device may comprise a pin which is manually inserted through a chain link or through the rotor into the stationary housing. However, such a reverse movement prevention device is too simple for smooth or automatic operation. Thus a reverse movement prevention device utilizes a spring which is coupled to the pin in a suitable manner to guide such pin, and then the said pin is automatically engaged with and disengaged from the rotor and/or housing at a determined relative position. The structure of such a reverse movement prevention is complex and complicated and prevents reliable or smooth operation of the apparatus.

In an embodiment of the chain drive and housing arrangement of the present invention, the chain is positioned between the rotor, which is rotatable, and the housing, which is stationary, and the rotor can be rotated only by rotation of a drive shaft provided for said rotor. The drive shaft is an eccentric shaft relative to the axis of the rotor, so that the chain, which is in engagement with the rotor and the housing, cannot move unless driving force is applied to the drive shaft. The chain thus remains stationary when the chain drive is stopped, and does not slip or move in either forward or reverse direction. Thus, a reverse movement prevention device is unnecessary in the chain drive and housing arrangement of the present invention.

Another object of the present invention is to provide a chain drive and housing arrangement of small size. In prior art apparatus, only the chain wheel or rotor and the chain are in engagement. Alternate links of the chain engage with the chain wheel so that the diameter of the chain wheel must be large and the chain drive apparatus is of large size.

In the chain drive apparatus of the present invention, the chain is not only engaged with both the rotor and the housing, but every link of the chain is engaged. Effective operation is thus provided by apparatus of small size. Furthermore, no gear structure, such as a worm gear arrangement for driving the chain or reducing the driving power as hereinbefore mentioned is required. The chain drive apparatus of the present invention is thus of simple structure and small size.

Another object of the present invention is to provide a chain driving device which is sturdy, strong, durable, reliable and efficient in operation. The chain drive of the present invention operates smoothly and effectively. The components or parts of the chain drive of the present invention, and the chain, are free from damage. Damage to the components of the chain drive or to the chain is prevented by the operation and cooperation of the rotor and the stationary housing with the chain. Each of the rotor and housing functions to prevent damage of the chain links by the other of the rotor and the housing due to force applied to said chain links. Forces applied to the rotor and the housing by the chain, on the other hand, are divided between said rotor and said housing so that no damage is done.

The disengagement of the chain from the rotor and the housing in the chain drive apparatus of the present invention due to movement or shifting of the rotor, damage or deformation may also be prevented by the engaging and disengaging operation of the apparatus. The chain drive apparatus of the present invention does not require a reverse movement prevention device or special gearing, as hereinbefore explained, so that since such components are not utilized they cannot be damaged. Furthermore, the engaging and disengaging of the chain is smooth and regular and does not tend to damage the chain, the rotor or the housing. The chain drive and housing of the present invention is thus very sturdy, and may be utilized for a prolonged period without maintenance or repair and with full reliability.

Another object of the present invention is to provide a chain drive and housing which may be produced by casting or from metal plates or plating. Generally, a device of simple structure may be manufactured from metal plates. A device of uneven or irregular structure, however, may be more readily manufactured by casting. Thus, a configuration which is very complex, complicated and irregular may be readily cast, but is subject to being damaged. The chain drive and housing of the present invention may be constructed with curves which are simple and which enable simple shaping of plates or plating. The chain drive apparatus of the present invention may thus be manufactured by bending and shaping metal plates and the resultant apparatus is strong and durable. The chain drive apparatus of the present invention made from metal plates may provide a greater strength and durability than the chain drive apparatus made by casting, because of the inherently greater strength of the plate-formed device.

Another object of the present invention is to provide chain drive apparatus suitable for installation on various vehicles. The small size of the chain drive apparatus of the present invention enables installation in a small space or area and does not add sufficient weight or volume to the vehicle to affect its capacity or operation.

Another object of the present invention is to provide a chain drive which may be operated easily and freely with light or reduced motive power, especially manually, and provide all the aforementioned advantages. This is achieved by utilization of the eccentric drive shaft to drive the rotor and to perform work greater than the driving force on the drive shaft. Thus, for example, it is very difficult to mount a spare tire on a truck and to move such spare tire from its mount to replace a flat tire. The difficulty is due to the weight and bulk of the spare tire and to its position under the chassis of the truck. The tire is very heavy, since it is mounted on a spare wheel and is very difficult to handle because the area of its mounting is more often than not inaccessibly close to the road. Two men or more must work together to handle a truck tire. The chain drive apparatus of the present invention enables a single man to handle the tire and wheel easily and smoothly.

In order that the present invention may be readily carried into effect, it will now be described with reference to the accompanying drawings, wherein:

FIG. 1 is a partly cut away side view, partly in section, of an embodiment of the chain drive and housing of the present invention;

FIG. 2 is a view, partly in section, of the embodiment of FIG. 1;

FIG. 3 is a partly cut away perspective view, partly in section, of the embodiment of FIG. 1;

FIG. 4 is a perspective view of the rotor and drive shaft of the embodiment of FIG. 1;

FIG. 9 is a partly cut away perspective view, partly in section, of a modification of the embodiment of FIG. 5;

FIG. 10 is a side view of half the embodiment of FIG. 5 to illustrate the operation of the embodiment of FIG. 5; and FIG. 11 is a perspective view of an arrangement applying the chain drive and housing of the present invention to a vehicle.

In the figures, the same components are identified by the same reference numerals.

Figure 5:
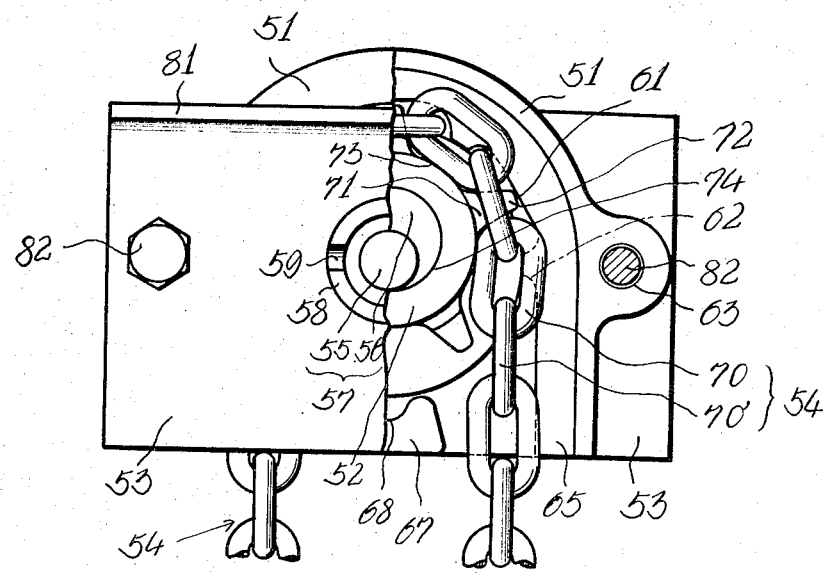
FIG. 5 is a partly cut away side view of another embodiment of the chain drive and housing of the present invention.

In the embodiment of FIGS. 1, 2, 3, and 4, the chain drive housing arrangement comprises two half portions, each of similar configuration as that of the other. The two portions of the housing are affixed to each other after the chain drive or rotor and the chain are positioned therein. Each of the two portions 1 of the housing comprises a plurality of projections 11 circumferentially spaced around the inside thereof, the projections 11 of each half contacting the corresponding projections 11 of the other half when both halves are joined.

The projections 11 form depressions, impressions, hollows, indentations or cavities 12 between them. The chain links 20 of the chain 4 are positioned in the indentations 12. A hole 13 is provided through each side of each of the two portions 1 of the housing. A bolt 32 is passed through each of the holes 13 and through corresponding holes provided through side plates 3 to affix the housing halves 1 and the side plates 3 to each other. Each of the side plates 3 is of substantially L-shaped configuration to provide a surface 31 for affixing the chain drive and housing apparatus to a suitable support such as, for example, a vehicle, as illustrated in FIG. 11.

A hole 17 is formed through each of the housing halves 1 and a hole 30 is formed through each of the side plates 3 in the area of the center thereof. Shaft bearings are positioned in the holes 17 and 30. Each of the housing portions 1 is of substantially U-shaped configuraion, so that when they are affixed to each other in edge-to-edge position they form a closed housing. Each of the housing portions 1 has a bottom portion 14 with half of a hole formed through it at two spaced points at its edge, so that when the two housing portions 1 are affixed to each other two holes 15 are formed through the bottom portion 14 through which the chain 4 passes. A projection 16 is provided inside the housing between the holes 15.

The chain 4 comprises links 20' which are substantially parallel to the peripheral surface of the rotor or chain wheel 2 and links 20 which are substantially perpendicular to said peripheral surface. The rotor 2 is positioned in the housing formed by the halves 1. The chain 4 is positioned on the rotor 2 and the links 20 are positioned in depressions, hollows, impressions, indentations or cavities 21 formed in the peripheral surface of the rotor 2. The links 20' of the chain 4 are positioned in channels or grooves 22 which are formed in the surface of the rotor 2 between the depressions 21 and extend circumferentially. Thus, each of the depressions 21 and each of the grooves 22 has about half a link of the chain positioned in it.

A central hole 24 is formed through the rotor 2 about the axis of said rotor. A shaft 6 is passed through the hole 24 of the rotor 2. A shaft 5 extends from both planar ends of the shaft 6 in an off-center position to form with said shaft 6 an eccentric shaft 7. The shaft 6 is inserted in the hole 24 of the rotor 2 and the shaft 5 is inserted into the holes 17 of the housing halves 1 and the holes 30 of the side plates 3. A cylindrical sleeve 8, having a substantially diametrical slot 9 formed therein from one end thereof, is affixed to one end of the shaft 5.

The rotor 2 is of essentially toroidal configuration and has substantially circular side walls 25. A substantially annular or toroidal collar 26 projects from the surface of each of the side walls 25 around the hold 24 formed therethrough. Each of the collars 26 is substantially coaxially with the hole 24 and each of said collars serves as a washer between the rotor 2 and the housing to aid in providing smooth rotation of said rotor.

When the drive shaft 5 is driven through the sleeve 8 such as, for example, by a revolving member inserted into the slot 9 of said sleeve in coupling relation therewith, the eccentric shaft 7 revolves. The shaft 6 of the eccentric shaft 7 revolves eccentrically and provides an eccentric rotation to the rotor 2. The eccentric rotation is imparted to the peripheral surface area of the rotor 2, so that if the chain 4 is not positioned between said rotor and the housing, and if the surface friction of the eccentric shaft 7 in the hole 24 is negligible, the said rotor will not rotate at all. In such case, the rotor 2 will be rotated only eccentrically. That is, the rotor 2 will be moved in radial directions about the shaft 5 to an extent determined by the eccentricity of the eccentric shaft 7. Actually, surface friction between the shaft 6 and the rotor 2 in the hole 24 therethrough causes a tendency of said rotor to rotate about said shaft 6, also.

When the eccentric shaft 7 is driven, and the chain 4 is positioned between the rotor 2 and the housing, however, the eccentric rotation of said rotor forces the chain links 20 into each of the depressions 12 formed in the housing, in succession, so that rotation of said rotor is suppressed by the chain links 20 positioned in the depressions 12 and the projections 11 of said housing. The suppression of rotor rotation causes the rotor 2 to move with the eccentric shaft 7 in a sliding, floating motion at the hole 24.

The chain 4 may thus be driven due to the difference between the position angles of the cavities 21 or the grooves 22 of the rotor 2 and the position angles of the engaging projections 11 of the housing. That is, the chain 4 is driven by the difference between the number of cavities 21 or grooves 22 and the number of projections 11. The inner diameter of the housing must accordingly be greater than the outer diameter of the rotor 2. The spacing between successive projections 11 are determined in number in accordance with the size of the links of the chain 4 and the angle of separation of adjacent projections 11, that is the included angle between radii passing through the centers of the projections, is smaller than the angle of separation of adjacent depressions 21 of the rotor 2, that is the included angle between radii passing through the centers of adjacent depressions 21.

In the illustrations of FIGS. 1, 2, 3 and 4, the separation angle of the projections 11 is 60 degrees and six said projections are provided, and the separation angle of the depressions 21 is 72 degrees and five depressions 21 are provided. During rotation of the eccentric shaft means 7, the rotor 2 will be shifted relative to the housing depending on the position of the eccentricity of the shaft means and thereby the chain links extending normal to the periphery of the rotor will be pressed successively into successive depressions 12 (FIG. 1) of the housing and released therefrom. Starting out from the position of chain, rotor and eccentric shaft means as shown in FIG. 1, it will be seen that during rotation of the shaft means in clockwise direction, the uppermost chain link to the right of a vertical passing through the axis of the shaft means will be pushed further into the corresponding depression 12 towards the right until its right side engages the right flank of the corresponding projection 11, imparting thereby a moment in counterclockwise direction on the rotor 2, while the link to the left of the aforementioned vertical line, not shown in FIG. 1, moves out of its depression and is free to move downwardly. In other words, the housing 1 with its depressions 12 and projections 11 will act like an outer gear on which the inner gear formed by the rotor 2 and the chain thereon rolls during turning of the eccentric shaft means. The operating principle of the arrangement according to the present invention is in certain respects similar to the operating principle of the strain wave gearing for instance disclosed in the U.S. Patent No. 2,906,143 to Musser. Thus, when the eccentric shaft 7, and specifically the shaft 5 thereof, is rotated 360 degrees, the rotor 2 is rotated 72 degrees in the reverse direction from the direction of rotation of said eccentric shaft and the chain 4 is moved into the housing through one of the holes 15 and out of said housing through the other of the holes 15.

If a load is placed on the chain 4 while it is passing through the housing, the movement of the chain links 20 is stopped by the projections 11 as said chain links move into the depressions 12. Furthermore, the chain links 20 move into the depressions 21 and stop the movement of the chain links by abutting against the ribs 27 between said depressions 21. In other words, since the movement of the chain 4 is stopped by the stoppage of both the chain links 20 and the chain links 20' the load is held in position by said chain. The chain links 20 and the chain links 20' apply forces in opposite radial directions. Thus, for example, the abutment of the chain links 20' against the ribs 27 enhances the force of abutment of the chain links 20 against the projections 11, so that the chain 4 cannot move inadvertently. Furthermore, the depth of position of the chain links is not great and is considerably less than the depth of position of the chain links in prior art chain drive apparatus.

Figure 6:
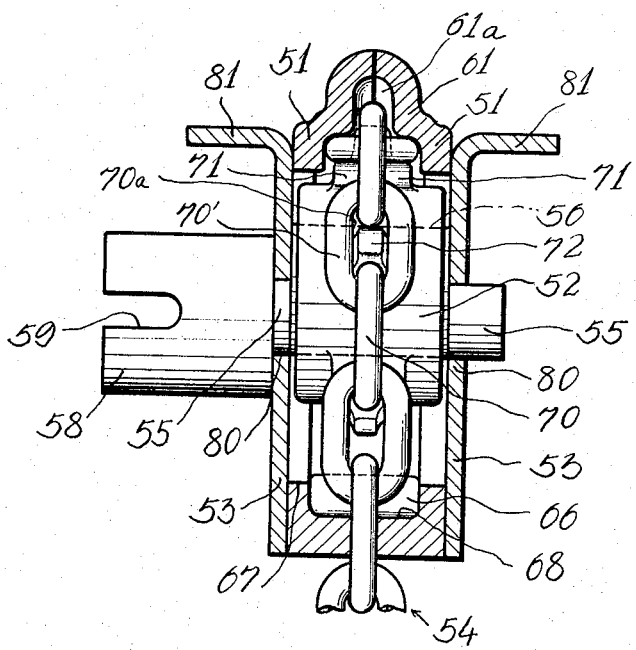
FIG. 6 is a view, partly in section, of the embodiment of FIG. 5.
Figure 7:
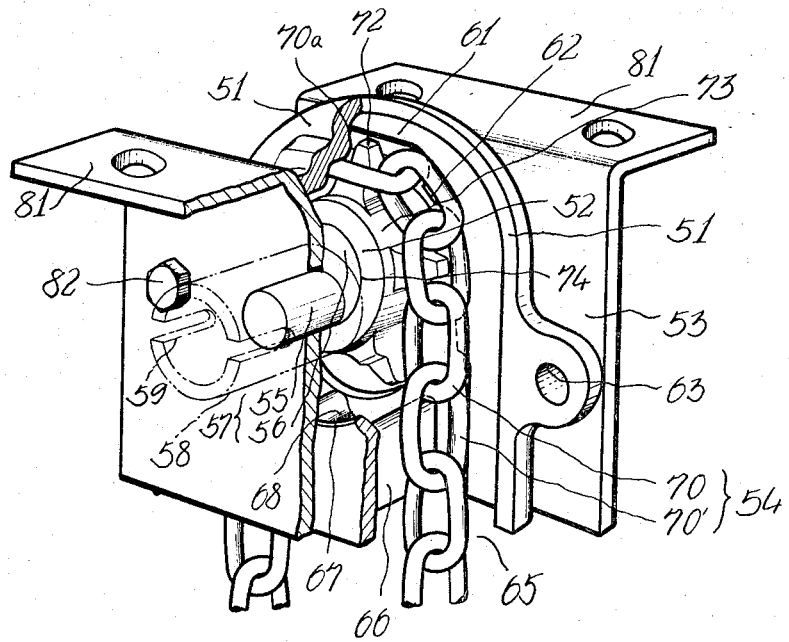
FIG. 7 is a partly cut away perspective view, partly in section, of the embodiment of FIG. 5.

FIGS. 5, 6 and 7 illustrate another embodiment of the chain drive and housing arrangement of the present invention. In FIGS. 5, 6, and 7, the housing halves 51 are substantially similar to each other and are adjusted to be fastened together in edge-to-edge relation as are the housing halves 1 of the embodiment of FIG. 1. Each of the housing halves 51 has a narrow extending portion 61 so that when said halves are joined together they form a channel or groove 61a between them. The chain links 70 are positioned in the groove 61a since said groove extends around the inner circumference of the housing and said chain links are substantially perpendicular to the peripheral surface of the rotor 52. The chain 54 comprises the chain links 70 and chain links 70', the chain links 70' being substantially parallel to the peripheral surface of the rotor 52. A plurality of projections 62 are formed in each of the housing halves 51 in spaced relation to each other and corresponding in position in each half so that when said halves are affixed to each other corresponding pairs of projections 62 form the projections of the housing. The projections 62 are circumferentially spaced from each other and extend into the housings.

Holes 63 are formed through both sides of each housing half 51 and through a pair of side plates 53 to enable the housing halves and side plates to be fastened together by suitable means such as bolts. Each of the side plates 53 is similar to the corresponding side plates 3 of the embodiment of FIGS. 1, 2, 3 and 4, so that each of said side plates has a surface 81 for affixing the chain drive and housing apparatus to a suitable support. The housing halves 51 and side plates 53 may be joined to each other by bolts 82, for example.

A central hole is formed through each of the housing halves 51 and a hole 80 is formed through each of the side plates 53 in the area of the center thereof. Shaft bearings are positioned in the holes 80. Each of the housing portions 51 is of substantially U-shaped configuration so that when they are affixed to each other in edge-to-edge position they form a closed housing. Each of the housing portions 51 has an open portion 67 which is covered by the side plate adjacent each housing portion. The bottom portion of each housing portion 51 is open except for a projecting portion 66 having a channel or groove 68 formed therein to permit passage of projections 72 of the rotor 52. Thus, when the two housing portions 51 are affixed to each other two holes 65 are formed through the bottom portion through which the chain 54 passes. The holes 65 are spaced from each other.

In the embodiment of FIGS. 5, 6 and 7, the chain 54 is moved by the rotor 52. An eccentric shaft 57, comprising a shaft 55 and a shaft 56, is inserted in a central hole formed through the rotor 52 and in the bearing holes 80 and drives the rotor. The eccentric shaft 57 is similar to that of the embodiment of FIGS. 1, 2, 3 and 4 and includes a similar sleeve 58 having a slot 59 formed therein. The rotor 52 comprises a plurality of projection areas 71 circumferentially spaced around its peripheral surface. Each of the projection areas 71 has a projection 72 extending substantially radially from substantially the center of the projection area. The projection areas 71 and therefore the projections 72 are spaced about 72 degrees from each other around the peripheral surface of the rotor 52. The chain links 70' are positioned on the projection areas 71 with the projections 72 passing through the holes 70a of the chain links 70'. Each of the projection areas 71 is spaced from the next adjacent projection areas to provide areas 72 therebetween in which the chain links 70 are positioned.

In the embodiment of FIGS. 5, 6 and 7, the rotor 52 is rotated eccentrically, as is the rotor 2 of the embodiment of FIGS. 1, 2, 3 and 4, by the eccentric shaft 57 which is in turn driven by any suitable means via the sleeve 58 thereof. In the embodiment of FIGS. 5, 6 and 7, however, the chain links 70' are positioned on the projection areas 71 and the projections 72 pass through the holes 70a of said chain links. Part of each of the chain links 70 are positioned in the groove 61a so that the chain links 70 are maintained substantially perpendicular to the the peripheral surface of the rotor.

When the eccentric shaft 57 is rotated, the shaft 56 rotates eccentrically and rotates the rotor 52 eccentrically in radial directions. The projections 62 of the housing extend between the chain links 70' and serve as checks on said chain links. This produces movement of the chain 54 through the housing. The movement of the chain 54 is the same as the movement of the chain 4 of the embodiment of FIGS. 1, 2, 3 and 4.

FIG. 10 illustrates the operation of the embodiment of FIGS. 5, 6 and 7. When the shaft 55 of the eccentric shaft 57 is rotated in a counter clockwise direction, as indicated by the arrow on the shaft 55, the rotor 52 and the chain 54 are eccentrically rotated in a clockwise direction, as indicated by the broken arrows from the dark line rotor and chain positions to the light line rotor and chain positions. The projections 72 of the rotor 52 are thus moved clockwise and move the chain links clockwise.

Figure 8:
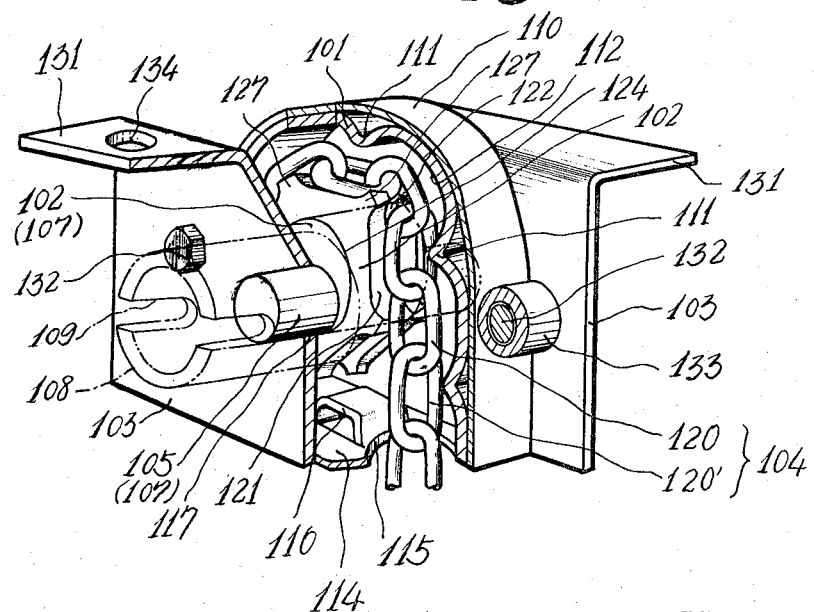
FIG. 8 is partly cut away perspective view, partly in section, of a modification of the embodiment of FIG. 1.

The chain drive and housing arrangement of the present invention may be manufactured by casting or molding or by plates or plating. FIGS. 8 and 9 illustrate the embodiments of FIGS. 1, 2, 3, and 4, and 5, 6 and 7, respectively, made from worked plates. In FIG. 8, which is the embodiment of FIGS. 1, 2, 3 and 4, a single metal plate is bent to form the housing 101 or to form each of two halves of the housing. Projections 111, circumferentially spaced from each other and forming depressions, impressions, hollows, identations or cavities 112, are formed from a single metal plate or sheet. The chain links 120 are positioned in the indentations 112. The chain links 120 of the chain 104 are positioned substantially perpendicularly to the peripheral surface of the rotor 104.

The housing 101 has a bottom portion 114 having two spaced holes 115 formed therethrough through which the chain 104 passes. A projection 116 is provided in the bottom portion 114 between the holes 115. An outer cover 110, formed from a single metal sheet or plate, may be positioned over the housing 101 and serves as a dust cover. Side plates 103, which are similar to the side plates 3 and 53, may be affixed to each other, with the housing 101 and cover 110 positioned between them, by any suitable means such as, for example, bolts 132 which may pass through holes through said side plates directly or through sleeves 133 extending from each of said side plates toward the other around the holes provided therefor. Each of the side plates 103 provides a surface 1313 for affixing the chain drive and housing apparatus to a suitable support.

The rotor 102 and the eccentric shaft 107 are similar to the rotor 2 and eccentric shaft 7 of FIGS. 1, 2, 3 and 4. The rotor 102 has depressions, indentations, impressions, hollows or cavities 131 formed in the peripheral surface thereof. The chain links 120' are positioned in the hollows 131. Channels or grooves 122 are formed in the surface of the rotor 102 between the depressions 121 circumferentially. The chain links 120 are positioned in the grooves 122. Ribs 127 are provided between the depressions 121. A central coaxial hole 124 formed through the rotor 102 enables said rotor to be mounted on the eccentric shaft 107. The shaft 105 of the eccentric shaft 107 is rotatably supported in the center holes 17 of the side plates 103. The sleeve 108 is affixed to one end of the shaft 5 has a slot 109 formed therein to enable driving of said shaft.

The chain drive and housing arrangement of FIG. 8 functions in the same manner as the embodiment of FIGS. 1, 2, 3 and 4. The projections 111 of the housing 101 check the chain links 120' of the chain 104 and prevent movement of the chain links 120 and of said chain. The sheet or plate structure of the housing 101 strengthens said housing and makes it resistant to deformation due to shock or impact.

In FIG. 9, which is the embodiment of FIGS. 5, 6 and 7, the two housing halves 151 comprise metal plates or sheets of substantially L-shaped cross-section positioned with their corresponding sides 160 in back-to-back or adjacent relation with a space 163 provided between said sides. A cover 160 may be provided over the housing halves 151 and the space 163. The inner parts of the sides 169 of the housing halves 151 adjacent the rotor 152 are provided with a plurality of projections 161 formed in spaced relation to each other and circumferentially spaced to form hollows, depressions, impressions, indentations or cavities 162 therebetween. Side plates 153 are similar to the side plates 53 of the embodiment of FIGS. 5, 6, and 7 are are affixed to each other by any suitable means such as, for example, bolts 182 passing through holes 184 formed through said side plates. The housing halves 151 are held together between the fastened side plates 153.

The rotor 152, which is similar to the rotor 52 of FIG. 5, is mounted on the eccentric shaft 157, which is similar to the eccentric shaft 57 of FIG. 5, in the same manner as indicated with reference to the foregoing figures. The eccentric shaft 157 comprises a shaft 155 and a shaft 156. The shaft 155 passes through holes formed through the side plates 153. The eccentric shaft 157 passes through a central axial hole 174 formed through the rotor 152. The embodiment of FIG. 9 functions in the same manner as the embodiment of FIGS. 5, 6 and 7.

The rotor 152 comprises a plurality of projection areas 171 circumferentially spaced around its peripheral surface. Each of the projection areas 171 has a projection 172 extending substantially radially from substantially the center of the projection area. The chain links 170' are positioned on the projection areas 171 with the projections 172 passing through the holes 170a of the chain links 170'. Each of the projections areas 171 is spaced with the next adjacent projection areas to provide areas 173 therebetween on which the chain links 170 are positioned. The housing includes a bottom plate 169 having a projection portion 166 having a channel or groove 168 formed therein to permit passage of the projections 172 of the rotor 152. The projection portion 166 may be formed by bending, punching or any suitable sheet metal working process on the bottom plate 169.

FIG. 11 illustrates an application of the chain drive and housing arrangement of the present invention. The application of FIG. 11 is to a motor vehicle such as, for example, a truck. The chain drive apparatus may be utilized to support and to move a spare tire, and wheel, as illustrated in FIG. 11, which does not, however, show such a tire or wheel in transit.

In FIG. 11, the chain drive apparatus of the present invention is affixed to a part 202 of the frame or chassis on the underside of a truck. One end of the chain 4, or 54, 104 or 154, is fixed in position by any suitable means such as, for example, by being bolted to the frame of the truck. The other end of the chain is affixed to a loading plate, ring, platform or the like 203, after the chain is passed through the chain drive apparatus. The loading plate 203 is adapted to support the tire and wheel to be moved by the chain.

The sleeve 8, or 58, 108 or 158, provided with the slot 9, or 59, 109, or 159, is positioned in a readily accessible place. A guide plate 206, having a central guide hole 205 formed therethrough with guide slots 204 extending diametrically opposite each other from said guide hole through said guide plate, is positioned spaced from the chain drive apparatus with the guide hole 205 coaxially positioned with the axis of the sleeve 8. The chain drive apparatus may be manually operated by a rod 207 having a stepped handle portion 208 to permit manual rotation of said rod about its axis. Diametrically opposed guide bars 209 extend from the rod 207 at the end opposite the handle portion 208.

The chain drive apparatus is operated by passing the rod 207 through the guide hole 205 of the guide plate 206 and positioning the guide bars 209 of the rod 207 in the slots 9 of the sleeve 8. With the rod 207 resting at its end in the slots 9 and at an intermediate portion in the guide hole 205 of the guide plate 206, said rod may be manually turned or rotated about its axis to rotate the rotor 2, 25, 52, 102, or 152 to move the chain up or down. The spare tire may thus be lifted to its storage position under the truck or lowered from said storage position to the road.

As hereinbefore explained with reference to the operation of the embodiments of the chain drive apparatus of the present invention, the interaction of the rotor and the housing via the chain prevents movement of the chain, regardless of the force or load on the chain due to the weight of the tire or wheel, and the chain will not move unless the rod 207 is rotated. Thus, regardless of the position of the chain, that is, regardless of the extent to which the spare tire and wheel have been moved by the chain, said chain will remain in position. The spare tire may thus be kept in any position beneath the vehicle, supported by the chain, and will not fall due to vibration or velocity of the vehicle. This is achieved, as previously described, without a reverse movement prevention device, since reverse movement prevention is inherent in the apparatus. Furthermore, as hereinbefore mentioned, the chain drive apparatus of the present invention may be of small size and small weight so that it does not adversely affect the operation of the truck. Also, since the rotor and other components of the chain drive apparatus are housed in the housing, the apparatus is protected by the housing.

The application of FIG. 11 is only one example of the application of the chain drive apparatus of the present invention. There are innumerable possible uses and applications for the chain drive and housing arrangement of the present invention. The many advantages and features of the chain drive and housing arrangement of the present invention, as hereinbefore mentioned, adapt it to considerably more uses than prior art chain drives. A cover or housing is preferably utilized with chain drive apparatus in order to keep the components free from dust and weather and to protect people from contact with the moving parts to prevent injury. Prior art chain drive apparatus comprises a rotor of such large size that the cover or housing required is of very large size. The chain drive apparatus of the present invention is of small size and thus requires but a small cover or housing.

Although basic operating examples of the chain drive and housing arrangement of the present invention are illustrated herein, the chain drive apparatus may be modified in accordance with the proposed application or use of the apparatus. Thus, for example, the number of depressions 21 of the peripheral surface of the rotor and the number of projections 11 of the housing may be increased. The difference in number between the depressions 21 and the projections 11 need not be one, but may be more than one. The smaller the difference in number between the depressions 21 and the projection 11, the greater the reduction which may be obtained and the greater the reduction in input power may be. The greater said difference, the smaller the reduction which may be obtained. The eccentric shaft should be varied in its various dimensions, accordingly.

While the invention has been described by means of specific examples and in specific embodiments, I do not wish to be limited thereto, for obvious modifications will occur to those skilled in the art without departing from the spirit and scope of the invention.

What I claim is:
1. Chain drive apparatus for moving a chain having a plurality of links, said apparatus comprising
a housing having chain engaging means therein;
a rotor positioned in said housing, said rotor having a peripheral surface having chain engaging means;
means positioning said chain in said housing between the chain engaging means of said housing and the chain engaging means of said rotor with the chain engaging means of said housing in engagement with selected links of said chain and with the chain engaging means of said rotor in engagement with selected other links of said chain; and shaft means turnably mounted in said housing and having an eccentric portion extending into said rotor and mounting said rotor for eccentric rotation relative to said housing, said shaft means being rotatable to drive said chain in one of a clockwise and counterclockwise direction by engaging and disengaging said chain from said housing and rotor chain engaging means.

2. Chain drive apparatus for moving a chain having a plurality of links, said apparatus comprising a housing having chain engaging means therein;

a rotor positioned in said housing, said rotor having a peripheral surface of substantially cylindrical configuration having chain engaging means comprising a plurality of circumferentially spaced depressions;

means positioning said chain in said housing between the chain engaging means of said housing and the chain engaging means of said rotor with the chain engaging means of said housing in engagement with selected links of said chain and with the chain engaging means of said rotor in engagement with links of said chain substantially parallel to the peripheral surface of said rotor, each of said substantially parallel links being positioned in a corresponding one of said depressions; and shaft means turnably mounted in said housing and having an eccentric portion extending into said rotor and mounting said rotor for eccentric rotation relative to said housing, said shaft means being rotatable to drive said chain in one of a clockwise and counterclockwise direction by engaging and disengaging said chain from said housing and rotor chain engaging means.

3. Chain drive apparatus for moving a chain having a plurality of links, said apparatus comprising a housing having chain engaging means therein;

a rotor positioned in said housing, said rotor having a peripheral surface of substantially cylindrical configuration having chain engaging means comprising a plurality of circumferentially spaced depressions separated by lateral ribs, each of said lateral ribs having a circumferential groove formed therein;

means positioning said chain in said housing between the chain engaging means of said housing and the chain engaging means of said rotor with the chain engaging means of said housing in engagement with selected links of said chain and with the chain engaging means of said rotor in engagement with alternate links of said chain substantially parallel to the peripheral surface of said rotor, each of said substantially parallel links being positioned in a corresponding one of said depressions and each of the alternate other links of said chain substantially perpendicular to the peripheral surface of said rotor being partially positioned in a corresponding one of said grooves; and shaft means turnably mounted in said housing and having an eccentric portion extending into said rotor and mounting said rotor for eccentric rotation relative to said housing, said shaft means being rotatable to drive said chain in one of a clockwise and counterclockwise direction by engaging and disengaging said chain from said housing and rotor chain engaging means.

4. Chain drive apparatus for moving a chain having a plurality of links, said apparatus comprising a housing having chain engaging means therein comprising a plurality of spaced projections;

a rotor positioned in said housing, said rotor having a peripheral surface having chain engaging means;

means positioning said chain in said housing between the chain engaging means of said housing and the chain engaging means of said rotor with the chain engaging means of said housing in engagement with selected links of said chain and with the chain engaging means of said rotor in engagement with selected other links of said chain; and shaft means turnably mounted in said housing and having an eccentric portion extending into said rotor and mounting said rotor for eccentric rotation relative to said housing, said shaft means being rotatable to drive said chain in one of clockwise and counterclockwise direction by engaging and disengaging said chain from said housing and rotor chain engaging means.

5. Chain drive apparatus for moving a chain having a plurality of links, said apparatus comprising a housing having chain engaging means therein comprising a plurality of circumferentially spaced substantially radially extending projections;

a rotor positioned in said housing, said rotor having a peripheral surface having chain engaging means;

means positioning said chain in said housing between the chain engaging means of said housing and the chain engaging means of said rotor with the chain engaging means of said housing in engagement with selected links of said chain and with the chain engaging means of said rotor in engagement with selected other links of said chain; and shaft means turnably mounted in said housing and having an eccentric portion extending into said rotor and mounting said rotor for eccentric rotation relative to said housing, said shaft means being rotatable to drive said chain in one of a clockwise and counterclockwise direction by engaging and disengaging said chain from said housing and rotor chain engaging means.

6. Chain drive apparatus for moving a chain having a plurality of links, said apparatus comprising a housing having chain engaging means therein comprising a plurality of circumferentially spaced depressions separated by substantially radially extending projections;

a rotor positioned in said housing, said rotor having a peripheral surface having chain engaging means;

means positioning said chain in said housing between the chain engaging means of said housing and the chain engaging means of said rotor with the chain engaging means of said housing in engagement with links of said chain substantially perpendicular to the peripheral surface of said rotor, each of said substantially perpendicular links being positioned in a corresponding one of said depressions and with the chain engaging means of said rotor in engagement with selected other links of said chain; and eccentric shaft means passing into said housing, and mounting said rotor for eccentric rotation of said rotor, said eccentric shaft means being rotatable to drive said chain in one of a clockwise and counterclockwise direction by engaging and disengaging said chain from said housing and rotor chain engaging means.

7. Chain drive apparatus for moving a chain having a plurality of links, said apparatus comprising a housing having chain engaging means therein comprising a plurality of circumferentially spaced depressions separated by substantially radially extending projections;

a rotor positioned in said housing, said rotor having a peripheral surface of substantialy cylindrical configuration having chain engaging means comprising a plurality of circumferentially spaced depressions separated by lateral ribs, each of said lateral ribs having a circumferential groove formed therein;

means positioning said chain in said housing between the chain engaging means of said housing and the chain engaging means of said rotor with the chain engaging means of said housing in engagement with links of said chain substantially perpendicular to the peripheral surface of said rotor, each of said substantially perpendicular links being positioned in a corresponding one of said depressions and with the chain engaging means of said rotor in engagement with alternate links of said chain substantially parallel to the peripheral surface of said rotor, each of said substantially parallel links being positioned in a corresponding one of said depressions and each of said substantially perpendicular other alternate links of said chain being partially positioned in a corresponding one of said grooves; and eccentric shaft means passing into said housing and mounting said rotor for eccentric rotation of said rotor, said eccentric shaft means being rotatable to drive said chain in one of a clockwise and counterclockwise direction by engaging and disengaging said chain from said housing and rotor chain engaging means.

8. Chain drive apparatus for moving a chain having a plurality of links, said apparatus comprising a housing having chain engaging means therein comprising a plurality of circumferentially spaced depressions separated by substantially radially extending projections and a bottom portion having spaced holes formed therethrough for passing said chain into and out of said housing;

a rotor positioned in said housing, said rotor having a peripheral surface of substantially cylindrical configuration having chain engaging means comprising a plurality of circumferentially spaced depressions separated by lateral ribs, each of said lateral ribs having a circumferential groove formed therein;

means positioning said chain in said housing between the chain engaging means of said housing and the chain engaging means of said rotor with the chain engaging means of said housing in engagement with links of said chain substantially perpendicular to the peripheral surface of said rotor, each of said substantially perpendicular links being positioned in a corresponding one of said depressions and with the chain engaging means of said rotor in engagement with alternate links of said chain substantially parallel to the peripheral surface of said rotor, each of said substantially parallel links being positioned in a corresponding one of said depressions and each of said substantially perpendicular other alternate links of said chain being partially positioned in a corresponding one of said grooves;

eccentric shaft means passing into said housing and mounting said rotor for eccentric rotation of said rotor, said eccentric shaft means being rotatable to drive said chain in one of a clockwise and counterclockwise direction by engaging and disengaging said chain from said housing and rotor chain engaging means; and a side plate affixed to each of opposite sides of said housing for providing a surface for mounting said chain drive apparatus.

9. Chain drive apparatus for moving a chain having a plurality of links, said apparatus comprising a housing having chain engaging means therein comprising a plurality of circumferentially spaced depressions separated by substantially radially extending projections and a bottom portion having spaced holes formed therethrough for passing said chain into and out of said housing;

a rotor positioned in said housing, said rotor having a peripheral surface of substantially cylindrical configuration having chain engaging means comprising a plurality of circumferentially spaced depressions separated by lateral ribs, each of said lateral ribs having a circumferential groove formed therein;

means positioning said chain in said housing between the chain engaging means of said housing and the chain engaging means of said rotor with the chain engaging means of said housing in engagement with links of said chain substantially perpendicular to the peripheral surface of said rotor, each of said substantially perpendicular links being positioned in a corresponding one of said depressions and with the chain engaging means of said rotor in engagement with alternate links of said chain substantially parallel to the peripheral surface of said rotor, each of said substantially parallel links being positioned in a corresponding one of said depressions and each of said substantially perpendicular other alternate links of said chain being partially positioned in a corresponding one of said grooves;

eccentric shaft means passing into said housing and mounting said rotor for eccentric rotation of said rotor, said eccentric shaft means being rotatable to drive said chain in one of a clockwise and counterclockwise direction by engaging and disengaging said chain from said housing and rotor chain engaging means;

a side plate affixed to each of opposite sides of said housing for providing a surface for mounting said chain drive apparatus; and slotted sleeve means affixed to one end of said eccentric shaft means for facilitating rotation of said eccentric shaft means.

10. Chain drive apparatus for moving a chain having a plurality of links, said apparatus comprising a housing having chain engaging means therein;

a rotor positioned in said housing, said rotor having a peripheral surface of substantially cylindrical configuration having chain engaging means comprising a plurality of circumferentially spaced projection areas;

means positioning said chain in said housing between the chain engaging means of said housing and the chain engaging means of said rotor with the chain engaging means of said housing in engagement with selected links of said chain and with the chain engaging means of said rotor in engagement with links of said chain substantially parallel to the peripheral surface of said rotor, each of said substantially parallel links being positioned on a corresponding one of said projection areas; and shaft means turnably mounted in said housing and having an eccentric portion extending into said rotor and mounting said rotor for eccentric rotation relative to said housing, said shaft means being rotatable to drive said chain in one of a clockwise and counterclockwise direction by engaging and disengaging said chain from said housing and rotor chain engaging means.

11. Chain drive apparatus for moving a chain having a plurality of links, said apparatus comprising a housing having chain engaging means therein;

a rotor positioned in said housing, said rotor having a peripheral surface of substantially cylindrical configuration having chain engaging means comprising a plurality of circumferentially spaced projection areas each having a substantially radially extending projection extending therefrom;

means positioning said chain in said housing between the chain engaging means of said housing and the chain engaging means of said rotor with the chain engaging means of said housing in engagement with selected links of said chain and with the chain engaging means of said rotor in engagement with alternate links of said chain substantially parallel to the peripheral surface of said rotor, each of said substantially parallel links being positioned on a corresponding one of said projection areas with the corresponding projection passing into each of said substantially parallel links and each of the alternate other links of said chain substantially perpendicular to the peripheral surface of said rotor being positioned in a corresponding one of the spaces between said projection areas; and shaft means turnably mounted in said housing and having an eccentric portion extending into said rotor and mounting said rotor for eccentric rotation relative to said housing, said shaft means being rotatable to drive said chain in one of a clockwise and counterclockwise direction by engaging and disengaging said chain from said housing and rotor chain engaging means.

12. Chain drive apparatus for moving a chain having a plurality of links, said apparatus comprising a housing having chain engaging means therein comprising a circumferentially extending groove formed therein and a plurality of spaced projections;

a rotor positioned in said housing, said rotor having a peripheral surface having chain engaging means;

means positioning said chain in said housing between the chain engaging means of said housing and the chain engaging means of said rotor with the chain engaging means of said housing in engagement with selected links of said chain and with the chain engaging means of said rotor in engagement with selected other links of said chain; and eccentric shaft means passing into said housing and mounting said rotor for eccentric rotation of said rotor, said eccentric shaft means being rotatable to drive said chain in one of a clockwise and counterclockwise direction by engaging and disengaging said chain from said housing and rotor chain engaging means.

13. Chain drive apparatus for moving a chain having a plurality of links, said apparatus comprising a housing having chain engaging means therein comprising a circumferentially extending groove formed therein and a plurality of circumferentially spaced substantially radially extending projections;

a rotor positioned in said housing, said rotor having a peripheral surface having chain engaging means;

means positioning said chain in said housing between the chain engaging means of said housing and the chain engaging means of said rotor with the chain engaging means of said housing in engagement with selected links of said chain and with the chain engaging means of said rotor in engagement with selected other links of said chain; and eccentric shaft means passing into said housing and mounting said rotor for eccentric rotation of said rotor, said eccentric shaft means being rotatable to drive said chain in one of a clockwise and counterclockwise direction by engaging and disengaging said chain from said housing and rotor chain engaging means.

14. Chain drive apparatus for moving a chain having a plurality of links, said apparatus comprising a housing having chain engaging means therein comprising a circumferentially extending groove formed therein and a plurality of circumferentially spaced substantially radially extending projections;

a rotor positioned in said housing, said rotor having a peripheral surface having chain engaging means;

means positioning said chain in said housing between the chain engaging means of said housing and the chain engaging means of said rotor with the chain engaging means of said housing in engagement with links of said chain substantially perpendicular to the peripheral surface of said rotor, each of said substantially perpendicular links being positioned in said circumferentially extending groove and with the chain engaging means of said rotor in engagement with selected other links of said chain; and eccentric shaft means passing into said housing and mounting said rotor for eccentric rotation of said rotor, said eccentric shaft means being rotatable to drive said chain in one of a clockwise and counterclockwise direction by engaging and disengaging said chain from said housing and rotor chain engaging means.

15. Chain drive apparatus for moving a chain having a plurality of links, said apparatus comprising a housing having chain engaging means therein comprising a circumferentially extending groove formed therein and a plurality of circumferentially spaced substantially radially extending projections;

a rotor positioned in said housing, said rotor having a peripheral surface of substantially cylindrical configuration having chain engaging means comprising a plurality of circumferentially spaced projection areas each having a substantially radially extending projection extending therefrom;

means positioning said chain in said housing between the chain engaging means of said housing and the chain engaging means of said rotor with the chain engaging means of said housing in engagement with links of said chain substantially perpendicular to the peripheral surface of said rotor, each of said substantially perpendicular links being partially positioned in said circumferentially extending groove and with the chain engaging means of said rotor in engagement with alternate links of said chain substantially parallel to the peripheral surface of said rotor, each of said substantially parallel links being positioned on a corresponding one of said projection areas with the corresponding projection passing into each of said substantially parallel links and each of said substantially perpendicular other alternate links of said chain being positioned in a corresponding one of the spaces between said projection areas; and eccentric shaft means passing into said housing and mouning said rotor for eccentric rotation of said rotor, said eccentric shaft means being rotatable to drive said chain in one of a clockwise and counterclockwise direction by engaging said disengaging said chain from said housing and rotor chain engaging means.

16. Chain drive apparatus for moving a chain having a plurality of links, said apparatus comprising a housing having chain engaging means therein comprising a circumferentially extending groove formed therein and a plurality of circumferentially spaced substantially radially extending projections and a bottom portion having spaced holes formed therethrough for passing said chain into and out of said housing;

a rotor positioned in said housing, said rotor having a peripheral surface of substantially cylindrical configuration having chain engaging means comprising a plurality of circumferentially spaced projection areas each having a substantially radially extending projection extending therefrom;

means positioning said chain in said housing between the chain engaging means of said housing and the chain engaging means of said rotor with the chain engaging means of said housing in engagement with links of said chain substantially perpendicular to the peripheral surface of said rotor, each of said substantially perpendicular links being partially positioned in said circumferentially extending groove and with the chain engaging means of said rotor in engagement with alternate links of said chain substantially parallel to the peripheral surface of said rotor, each of said substantially parallel links being positioned on a corresponding one of said projection areas with the corresponding projection passing into each of said substantially parallel links and each of said substantially perpendicular other alternate links of said chain being positioned in a corresponding one of the spaces between said projection areas;

eccentric shaft means passing into said housing and mounting said rotor for eccentric rotation of said rotor, said eccentric shaft means being rotatable to drive said chain in one of a clockwise and counterclockwise direction by engaging and disengaging said chain from said housing and rotor chain engaging means;

a side plate affixed to each of opposite sides of said housing for providing a surface for mounting said chain drive apparatus; and slotted sleeve means affixed to one end of said eccentric shaft means for facilitating rotation of said eccentric shaft means.

17. Chain drive apparatus for moving a chain having a plurality of links, said apparatus comprising a housing having an inner surface provided with a plurality of chain engaging means uniformly spaced in circumferential direction;

a rotor positioned in said housing and having a peripheral surface having chain engaging means uniformly spaced in circumferential direction, the included angle between radii passing through the centers of adjacent chain engaging means of said housing being different from the included angle between radii passing through the centers of adjacent chain engaging means of said rotor, said chain being located in part between said inner surface of said housing and said peripheral surface of said rotor with the chain engaging means of said housing in engagement with selected links of said chain and with the chain engaging means of said rotor in engagement with selected other links of said chains; and shaft means turnably mounted in said housing and having an eccentric portion extending into said rotor and mounting said rotor for eccentric rotation relative to said housing, said shaft means being rotatable to drive said chain in one direction during rotation of said shaft means in the opposite direction by engaging and disengaging said chain from said housing and rotor chain engaging means.

18. An apparatus as defined in claim 17, wherein the included angle between the radii passing through the centers of adjacent chain engaging means of said housing is smaller than the included angle between the radii passing through the centers of adjacent chain engaging means of said rotor.

19. An apparatus as defined in claim 17, wherein the number of the chain engaging means of said housing differs at least by one from the number of the chain engaging means of said rotor.

20. An apparatus as defined in claim 19, wherein the number of the chain engaging means of said housing is greater than that of the chain means of said rotor.

References Cited
UNITED STATES PATENTS

| | | | |
|---|---|---|---|
| 554,890 | 2/1896 | Meier | 74—116 |
| 697,400 | 4/1902 | Fawcett | 74—571 |
| 845,506 | 2/1907 | Bardwell | 74—116 |
| 916,111 | 3/1909 | Cross | 254—167 |

FRED C. MATTERN, Jr., *Primary Examiner.*

W. S. RATLIFF, *Assistant Examiner.*